Nov. 25, 1930.   O. C. TRAVER   1,783,061
PROTECTIVE ARRANGEMENT
Filed Aug. 11, 1927

Inventor:
Oliver C. Traver,
by  Alexander S. Lunt
His Attorney.

Patented Nov. 25, 1930

1,783,061

UNITED STATES PATENT OFFICE

OLIVER C. TRAVER, OF SCHENECTADY, NEW YORK, ASSIGNOR TO GENERAL ELECTRIC COMPANY, A CORPORATION OF NEW YORK

PROTECTIVE ARRANGEMENT

Application filed August 11, 1927. Serial No. 212,347.

My invention relates to improvements in protective arrangements for electric circuits and more particularly to improvements in electric circuit protective arrangements, wherein selectivity is obtained by relays whose operation is dependent on the distance between the relay and the fault, whereby to provide maximum selectivity on circuits having a grounded neutral.

My invention will be better understood from the following description when considered in connection with the accompanying drawing and its scope will be pointed out in the appended claims.

Figure 1:
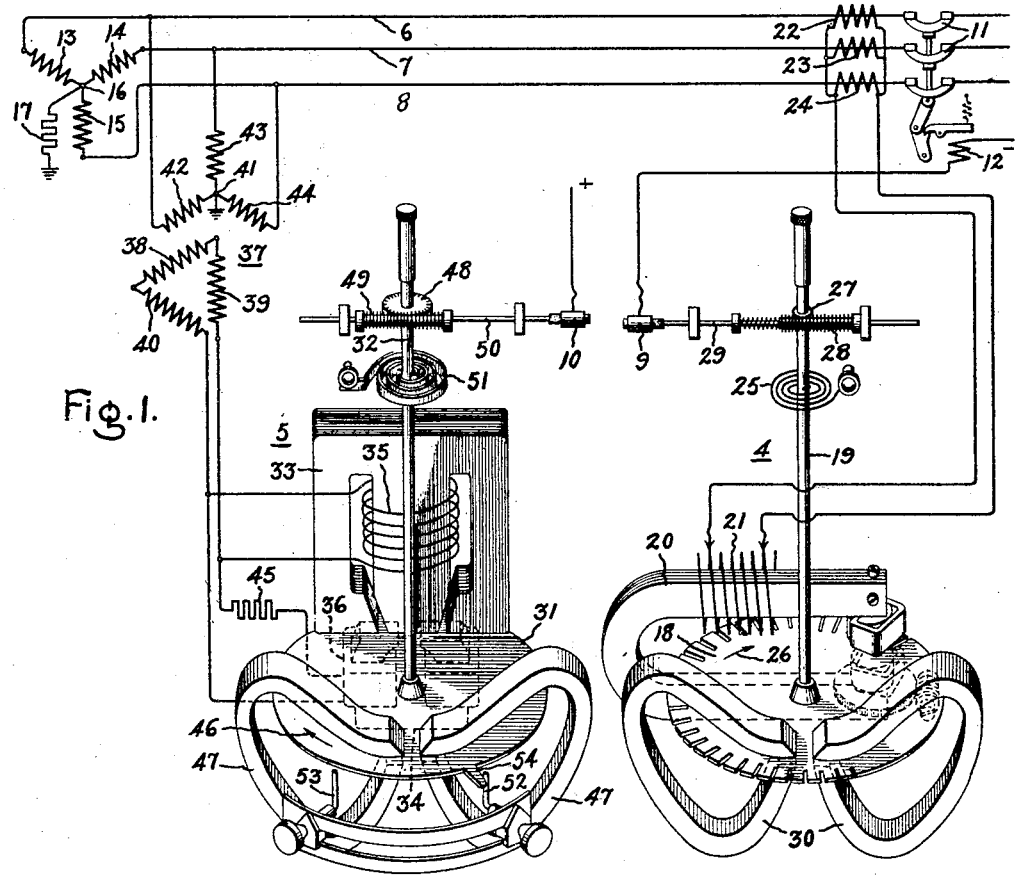
Figure 3:
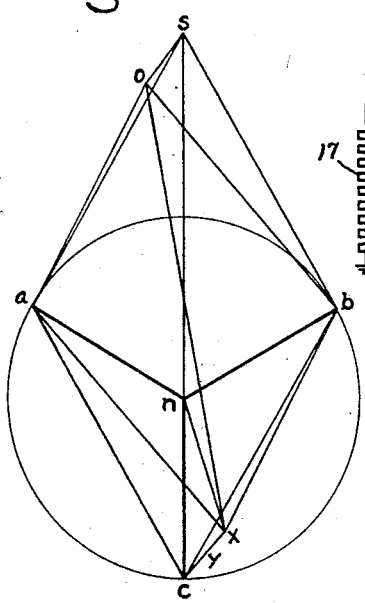
Figure 2:
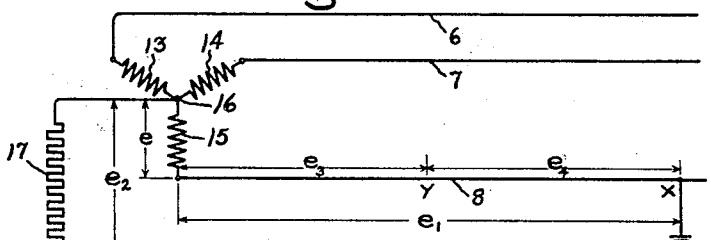

In the accompanying drawing, Fig. 1 illustrates, partly in diagram and partly in perspective, an embodiment of my invention, and Figs. 2 and 3 are line and vector diagrams respectively, explanatory of my invention.

In Fig. 1, I have illustrated my invention as embodied in an electric circuit protective arrangement comprising a relay of the distance type, that is, an over-current relay whose time of operation on the occurrence of a fault causing an over-current condition is dependent on the distance between the relay and the fault. The particular form of distance relay construction which I have chosen to illustrate my invention is disclosed in United States Letters Patent to me, No. 1,501,733, dated July 15, 1924. This relay in general comprises two electroresponsive elements 4 and 5 which may be of the induction disk type as shown and which are operative in response to functions of electric quantities such as the current and the voltage respectively of an electric circuit comprising conductors 6, 7, 8 to control two cooperating contacts 9, 10 respectively. These contacts are arranged to control suitable circuit controlling or interrupting means shown as a latched closed circuit breaker 11 having a trip coil 12. The circuit 6, 7, 8 is shown as comprising a plurality of windings 13, 14, 15 such as those of a three-phase generator or transformer having a neutral point 16 which may be grounded either directly or through an impedance such as a resistor 17 whose ohmic value may be relatively high.

The current responsive element 4 is illustrated as of the type disclosed in United States Letters Patent to Hall No. 1,539,812, dated May 26, 1925. This element as shown comprises a movable member or disk 18 of suitable conducting material secured to a suitably mounted rotatable member such as a shaft 19 and inductively associated with a torque exerting or motor element 20 of the shaded pole type. This motor element has an energizing winding 21 connected to be energized in accordance with the ground or residual current of the circuit, that is, the difference from zero of the vectorial sum of the currents in the conductors 6, 7, 8. For this purpose the winding 21 may be connected across the secondaries of current transformers 22, 23, 24 respectively associated with the conductors 6, 7, 8 and having their secondaries connected in parallel. The motor element 20 tends to rotate the disk 18 against the bias of a spring 25 in the direction indicated by the arrow 26. When the residual current exceeds a value such that the torque of the motor element 20 is sufficient to overcome the torque of the spring 25, the disk 18 is rotated at a velocity dependent on the current and moves the contact 9 toward the contact 10 through a pinion 27 on the shaft 19 and a rack 28 on the contact carrying rod 29. For retarding the movement of the disk 18 so as to increase the time, drag magnets 30 may be provided.

The voltage responsive element 5 comprises a disk 31 of suitable conducting material secured to a suitably mounted rotatable member such as a shaft 32 and inductively associated with a torque exerting or motor element comprising magnetic members 33, 34. These are arranged to be energized by windings 35, 36 respectively which according to my invention are connected to be energized in accordance with the resultant voltage to ground of the conductors of the circuit 6, 7, 8. For this purpose, the windings 35, 36 may be connected in parallel with each other and across the open delta connected secondaries 38, 39, 40 of a star-delta potential transformer 37, the neutral 41 of whose primaries 42, 43, 44 is grounded. The currents flowing in the windings 35, 36 consequently depend on the resultant voltage to ground of the conductors 6, 7, 8 at the relay location and are displaced in phase in accordance with the relative impedances of the windings. The phase relation may be further varied by the interposition of suitable means such as a resistance 45 in the circuit of one of the windings, 36, for example. The shifting magnetic field produced by the interaction of the magnetic members 33, 34 induces currents in the disk 31 and tends to cause the same to rotate, in the direction indicated by the arrow 46 and in a well-known manner, when the resultant voltage to ground differs from zero. Damping magnets 47 may be provided to retard the movement of the disk 31. In order that the contact 10 which is geared to the shaft 32 through a pinion 48 and a rack 49 on the contact carrying rod 50 may take a position dependent on the resultant voltage to ground, the torque which the motor element tends to exert is opposed by a suitable counter-torque means such as a spring 51 which tends to turn the disk in a direction opposite to that indicated by the arrow 46. The range of movement of the disk 31 may be controlled by suitable and preferably adjustable stops 52, 53 arranged in the path of movement of a projection 54 on the disk 31.

Under normal circuit conditions, that is, no ground fault on the circuit, the resultant voltage to ground of the conductors 6, 7, 8 is substantially zero and consequently the spring 51 predominates to hold the contact 10 in its extreme right-hand position that is closest to the contact 9 when in the normal or deenergized position. This normal or initial position of the contact 10 is determined by the projection 54 on the disk 31 abutting the stop 52. On the occurrence of a ground fault on the circuit 6, 7, 8, the torque of the spring 51 will be overcome in accordance with the resultant voltage to ground and the contact 10 moved to the left away from contact 9 an amount depending on the voltage. At the same time, the current responsive element will be energized and will effect movement of its contact 9 toward the contact 10. Consequently the time which it takes for the contacts to engage is dependent on the resultant voltage to ground of the conductors 6, 7, 8 and the residual current of these conductors, in other words, the time is dependent on the position of the contact 10 and the velocity at which the cooperating contact 9 is moved.

Referring now to Figs. 2 and 3 it will be clear that, since the resultant voltage to ground of the conductors 6, 7, 8 of the circuit decreases as the fault point is approached, relays installed at different points of the circuit will operate selectively to trip the circuit breaker nearest the fault. This is obvious since the smaller the resultant voltage the less the contact 10 is moved and therefore the less the contact 9 has to move to meet the contact 10 and the shorter the time.

Referring now to Fig. 2, $x$ represents a point on the conductor 8 faulted to ground, $y$ some point between the windings 13, 14, 15 and the fault, and $e$, $e_1$, $e_2$, etc., the voltages between the points indicated. In the vector diagram of Fig. 3, $na$, $nb$, and $nc$ represent the voltages across each of the windings 13, 14, 15, that is, the normal voltages above ground of the conductors, 6, 7, 8; $cx$ is the voltage drop $e_1$ and $nx$ the voltage ground, $e_2$ of the neutral 16, $nx$ being the difference between $e$ and $e_1$. Consequently $bx$ represents the voltage to ground of the conductor 7 and $ax$ the voltage to ground of conductor 6 at point $x$ where the voltage to ground of the conductor 8 is zero. The sum of the voltages $ax$ and $bx$, that is, the resultant voltage to ground of the conductors 6, 7, 8 is therefore $ox$ and through the medium of the potential transformer 37 a voltage proportional to this voltage is impressed on the windings 35, 36 of the relay, not shown, at point $x$. If a relay were situated at the station where the windings 13, 14, 15 are, then the voltage to ground of conductor 8 at this point would be $e-e=e_1$, that is, $cx$ or $os$. This added to the voltage to ground of conductors 6 and 7, that is, $bx$ and $ax$, gives a resultant voltage $cs$ which is substantially three times the voltage $e$ and is considerably greater than the resultant voltage to ground at $x$. For intermediate points, such as $y$, the resultant voltage will fall between the values $cs$ and $ox$. Consequently the contacts 10 of relays situated at these different points will be positioned farther from the contacts 9 accordingly as the relay is farther from the fault. Inasmuch as the voltages $ox$, $cs$, etc. in any case are approximately three times the voltage $e$, there is available sufficient voltage to produce a strong torque action and since there is a considerable variation in the voltages, the maximum selectivity is assured even though the neutral is grounded through a relatively high impedance.

While I have shown and described my invention in considerable detail, I do not desire to be limited to the exact arrangement shown, but seek to cover in the appended claims all those modifications that fall within the true spirit and scope of my invention.

What I claim as new and desire to secure by Letters Patent of the United States, is:—

1. In combination, an electric circuit, and controlling means therefor comprising a relay having an electroresponsive movable member, means for actuating said member at a velocity dependent on the residual current of the circuit when said current is above a predetermined value, a cooperating electroresponsive movable member, and means for positioning said cooperating member in accordance with the resultant voltage to ground of the conductors of the circuit.

2. In combination, an electric circuit and controlling means therefor comprising a distance relay having a movable member and means for positioning said member in accordance with the resultant voltage to ground of the conductors of the circuit.

3. In combination, an electric circuit having a neutral grounded through an impedance and means for controlling the circuit on the occurrence of a ground fault comprising a relay having two cooperating relatively movable contacts, means responsive to the residual current of the circuit for actuating one of the contacts when said current exceeds a predetermined value at a velocity dependent on the current, and means for positioning the other contact in accordance with the resultant voltage to ground of the conductors of the circuit.

4. In combination, an electric circuit having a grounded neutral and means for controlling the circuit on the occurrence of a ground fault comprising an electroresponsive element connected to be energized in accordance with the residual current of the circuit and having a contact arranged when said current exceeds a predetermined value to be actuated at a velocity dependent on the current and an electroresponsive element connected to be energized in accordance with the resultant voltage to ground of the conductors of the circuit and having a cooperating contact arranged to be positioned in accordance with said voltage.

5. In combination, an electric circuit and controlling means therefor comprising a distance relay having relatively movable cooperating contacts, and electroresponsive means operative on the occurrence of a fault for effecting a circuit controlling action of said contacts in a time dependent on the resultant voltage to ground of the conductors of the circuit.

6. In combination, an electric circuit and controlling means therefor comprising a distance relay having relatively movable cooperating contacts, and electroresponsive means operative on the occurrence of a fault for effecting a circuit controlling action of said contacts in a time dependent on the resultant voltage to ground of the conductors of the circuit and the residual current of the circuit.

7. In combination, an electric circuit having a grounded neutral and means for controlling the circuit on the occurrence of a ground fault comprising an electroresponsive element having a movable member, means for actuating said member in accordance with the residual current of the circuit and a cooperating electroresponsive element having a movable member, and means for actuating the member of said cooperating element in accordance with the resultant voltage to ground of the conductors of the circuit.

8. In combination, an electric circuit and controlling means therefor comprising a distance relay having two relatively movable cooperating contacts and means for positioning one of the contacts in accordance with the resultant voltage to ground of the conductors of the circuit.

In witness whereof, I have hereunto set my hand this 9th day of August, 1927.

OLIVER C. TRAVER.

Certificate of Correction

Patent No. 1,783,061.             Granted November 25, 1930, to

OLIVER C. TRAVER.

It is hereby certified that error appears in the printed specification of the above numbered patent requiring correction as follows: Page 2, line 93, after the word "be" strike out the formula and insert instead $c_2 = c_1$; and that the said Letters Patent should be read with this correction therein that the same may conform to the record of the case in the Patent Office.

Signed and sealed this 6th day of January, A. D. 1931.

[SEAL.]

M. J. MOORE,
*Acting Commissioner of Patents.*